United States Patent
Lemelev et al.

(10) Patent No.: US 10,146,461 B2
(45) Date of Patent: *Dec. 4, 2018

(54) AUTOMATIC BACK-UP SYSTEM WITH VERIFICATION KEY AND METHOD OF OPERATION THEREOF

(71) Applicant: ClevX, LLC, Kirkland, WA (US)

(72) Inventors: Alex Lemelev, Maple (CA); Lev M Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,499

(22) Filed: Apr. 23, 2018

(65) Prior Publication Data

US 2018/0246661 A1 Aug. 30, 2018

Related U.S. Application Data

(63) Continuation of application No. 14/985,045, filed on Dec. 30, 2015, now Pat. No. 9,977,614.

(60) Provisional application No. 62/098,249, filed on Dec. 30, 2014.

(51) Int. Cl.
| | |
|---|---|
| *G06F 12/00* | (2006.01) |
| *G06F 3/06* | (2006.01) |
| *G06F 11/14* | (2006.01) |
| *G06F 12/02* | (2006.01) |
| *G06F 21/62* | (2013.01) |

(52) U.S. Cl.
CPC ............ *G06F 3/0619* (2013.01); *G06F 3/065* (2013.01); *G06F 3/0683* (2013.01); *G06F 11/1446* (2013.01); *G06F 12/0238* (2013.01); *G06F 12/0246* (2013.01); *G06F 21/6245* (2013.01)

(58) Field of Classification Search
CPC ...... G06F 3/0619; G06F 3/065; G06F 3/0683; G06F 21/6245; G06F 12/0238; G06F 12/0246; G06F 11/1446

See application file for complete search history.

(56) References Cited

U.S. PATENT DOCUMENTS

| | | |
|---|---|---|
| 6,588,662 B1 | 7/2003 | Hu |
| 7,675,557 B2 | 3/2010 | Endo |
| 7,818,160 B2 | 10/2010 | Collins et al. |
| 8,233,895 B2 | 7/2012 | Tysowski |
| 8,359,432 B2 | 1/2013 | Rao |

(Continued)

FOREIGN PATENT DOCUMENTS

| | | |
|---|---|---|
| CN | 103902480 A | 7/2014 |
| EP | 1659474 A1 | 5/2006 |

OTHER PUBLICATIONS

"U.S. Appl. No. 14/985,045, 312 Amendment filed Mar. 20, 2018", 7 pgs.

(Continued)

*Primary Examiner* — Shawn X Gu
(74) *Attorney, Agent, or Firm* — Schwegman Lundberg & Woessner, P.A.

(57) ABSTRACT

A method of operation of an automatic back-up system includes: providing a mobile device; coupling a removable media device to the mobile device; automatically launching an application on the mobile device; and backing-up user data selected by the application from the mobile device to the removable media device.

18 Claims, 6 Drawing Sheets

(56) References Cited

U.S. PATENT DOCUMENTS

| | | | |
|---|---|---|---|
| 2007/0143097 A1* | 6/2007 | Brunet | G06F 11/1451 703/23 |
| 2010/0077229 A1 | 3/2010 | Yu et al. | |
| 2011/0022850 A1 | 1/2011 | Lee et al. | |
| 2013/0117854 A1 | 5/2013 | Britton et al. | |
| 2014/0250324 A1* | 9/2014 | Shih | G06F 11/1412 714/15 |
| 2016/0188235 A1 | 6/2016 | Lemelev et al. | |

OTHER PUBLICATIONS

"U.S. Appl. No. 14/985,045, Non Final Office Action dated Jul. 14, 2017", 13 pgs.

"U.S. Appl. No. 14/985,045, Notice of Allowance dated Jan. 29, 2018", 11 pgs.

"U.S. Appl. No. 14/985,045, PTO Response to Rule 312 Communication dated Apr. 13, 2018", 2 pgs.

"U.S. Appl. No. 14/985,045, Response filed Oct. 13, 2017 to Non Final Office Action dated Jul. 14, 2017", 15 pgs.

* cited by examiner

AUTOMATIC BACK-UP SYSTEM WITH VERIFICATION KEY AND METHOD OF OPERATION THEREOF

CLAIM OF PRIORITY

This application is a Continuation Application under 35 USC § 120 of U.S. patent application Ser. No. 14/985,045, entitled "Automatic Back-Up System with Verification Key and Method of Operation Thereof," filed on Dec. 30, 2015, which claims priority from U.S. Provisional Patent Application No. 62/098,249, filed Dec. 30, 2014, and entitled "System and Method for Automatic Backup on a Mobile Device", all of which are incorporated by reference in their entirety.

TECHNICAL FIELD

The present invention relates generally to backing up data, and more particularly to a system and method of backing up data from a mobile device.

BACKGROUND

Advances in computing have rendered huge changes to how people interact with media. Paper documents have been replaced by digital documents, music compact discs (CDs) and movie digital video discs (DVDs) have been replaced by streaming and downloadable content and printed photos have been replaced by digital ones.

As most user content has become digital over the years, even schools are encouraging students to work with digital files in order to make the process more efficient and have a lower impact on the environmental resources, e.g., saving paper to print homework.

Mobile sometimes called "portable" devices, like Smartphones, tablets, e-readers, and the like, are a norm and the presence of cameras on such devices and their connectedness enable users to interact with social media; e.g., Facebook®, Twitter®, LinkedIn®, etc. Over two trillions of pictures are taken by users each year, which takes a lot of memory on the mobile devices users are using. As a result, users always run out of memory on the mobile devices and are forced to delete some of their user-created-content to free space on the mobile device.

Also digital content is prone to corruption and virus attacks. Mobile devices can sustain physical damage due to drops, or may be stolen or replaced with the latest models. This necessitates that personal (user-created) content on such devices be backed up where it can be safe from hazardous situations and shared with other mobile devices and their users.

Additionally, many ordinary users are not technically savvy enough to use the complicated prior art data back-up solutions that are not always portable and accessible on-the-go.

Thus, it is increasingly critical that answers be found to these problems. In view of the ever-increasing commercial competitive pressures, along with growing consumer expectations and the diminishing opportunities for meaningful product differentiation in the marketplace, it is critical that an automated, easy to use, highly portable, and affordable back-up solution be offered. Additionally, the need to reduce costs, improve efficiencies and performance, and meet competitive pressures adds an even greater urgency to the critical necessity for finding answers to these problems.

Solutions to these problems have been long sought, but prior developments have not taught or suggested any solutions and, thus, solutions to these problems have long eluded those skilled in the art.

DISCLOSURE OF THE INVENTION

The present invention provides a method of operation of an automatic back-up system including: providing a mobile device; coupling a removable media device to the mobile device; automatically launching an application on the mobile device; and backing-up user data selected by the application from the mobile device to the removable media device.

The present invention provides an automatic back-up system including: a mobile device; a removable media device coupled to the mobile device; and a processing unit in the mobile device configured to: automatically launch an application on the mobile device, and back-up user data selected by the application from the mobile device to the removable media device.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
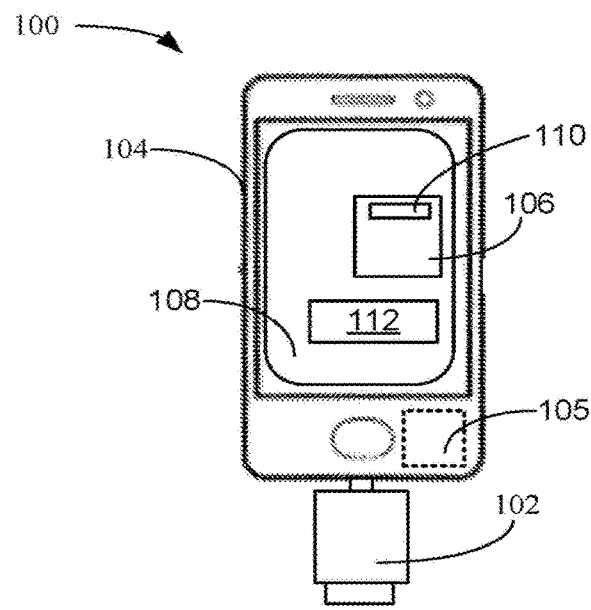
FIG. 1 shows a functional diagram of an automatic back-up system with verification key in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "module" referred to herein can include software, hardware, or a combination thereof in accordance with the context in which the term is used. For example, the software can be machine code, firmware, embedded code, or application software. Also for example, the hardware can be circuitry, processor, computer, integrated circuit, integrated circuit cores, a microelectromechanical system (MEMS), passive devices, etc. or a combination thereof.

The terms "coupling" or "pairing" referred to herein mean the logical connection and registration between devices in preparation for peer-to-peer communication. The term "malware" referred to herein means any malicious or privacy infringing software contained within a data set.

Embodiments of the present invention make the data back-up process from a mobile device e.g. a Smartphone, tablet/notebook computer, or the like, which are referred to as mobile computing devices or mobile devices. Many mobile operating systems also support a removable media device; e.g., a USB device, a wireless storage device, or the like. The present invention providing a method to automatically launch the data back-up application, or app, on a mobile device when the removable storage media device is coupled or paired to it.

A growing need for an automated data back-up method exists, whereby content from mobile computing devices like Smartphones and tablets can be backed up to a removable media device requiring minimal or no user interaction. The ability to preserve a contact list, play list, picture directory, or phone directory from the mobile device without requiring support from a network provider can be a great benefit. In some cases, a damaged or lost mobile phone also means the loss of essential user-created information that could be prevented when the user data is backed-up by the present invention.

It has been found that embodiments of the present invention provide a method of operation of a data back-up system including: connecting a removable media device, such as a USB storage device, to a mobile device; pairing of the removable media device with the mobile device using device secure key exchange; the automatic launching of the back-up application on the mobile device and transferring data from the mobile device to the removable media device for a back-up and potential content sharing; and the safe ejection of the removable media device upon back-up process completion so that the user can remove the removable media device safely by just unplugging it without performing any additional steps (such as safe ejection from the system menu).

It has been found that embodiments of the present invention provide a data back-up system, including: a coupling (pairing) module for creating a coupling between the removable media device and the mobile device; a back-up module, for automatically transferring data for back-up from the mobile device to the removable media device; a Sync module for ensuring that data is written to the removable media device and purged from the memory buffer of the mobile device; and an ejection module for automatic safe ejection of the removable media device.

It has been found that in some embodiments the removable media device can be used to automatically move user data from one mobile device to another or copying user-generated content from one mobile device for sharing with another.

Referring now to FIG. 1, therein is shown a functional diagram of an automatic back-up system 100 with verification key 110 in an embodiment of the present invention. The functional diagram of the automatic back-up system 100 depicts a removable media device 102 linked to a mobile device 104. The verification key 110 can include a vendor identification number (VID), product identification number (PID), a serial number (SN), a user generated secure key, or a combination thereof. The verification key 110 can be confirmed by the application 106 for allowing the coupling of the removable media device 102 and where the verification key 110 includes the VID, the PID, the SN, the user generated secure key, or the combination thereof.

The mobile device 104 can be a phone, a tablet computer, a digital camera, MP3 player, e-Reader, or the like. The collection of user data by these devices can create a problem if the user is not able to back-up and protect the user data. The mobile device 104 can also be a commercial point-of-sale terminal, security system, bar-scan reader, or the like.

The removable media device 102 can be a data storage or mass storage device that can be removably attached to the mobile device 104 while the mobile device 104 is still active. The removable media device 102 can be used for data transportation, back-up, or storage of data. The removable media device 102 can be connected and disconnected from the mobile device 104 and/or connected to and disconnected from the "like" mobile devices.

In addition to portability advantages, removable media device 102 can be capable of fast data back-up and recovery. The removable media device 102 can used to update information on the mobile device 104, including restoring contact information, updating inventory information, and providing a repository for security information for a remote security camera system.

The mobile device 104 can be coupled to the removable media device 102 by a wired or wireless interface. The mobile device 104 can have a USB interface, a Bluetooth interface, a proximity coupling interface, or a proprietary interface capable of coupling the removable media device 102.

The mobile device 104 can have a processing unit 105 for loading and executing an application 106, which is an application program for communicating with the removable media device 102. The application 106 can provide various capabilities, including encryption, malware scan, directory management, data back-up, secure key exchanges, coupling or pairing verification, and communication with the removable media device 102.

It is understood that the mobile device 104 is shown as a smart phone for ease of explanation and does not limit the invention to this embodiment. The mobile device 104 can have a user interface screen 108, which can display information for the application 106. While the removable media device 102 is shown physically linked, as with a wired interface, the coupling of the removable media device 102 and the mobile device 104 can use a wireless interface.

It has been discovered that the automatic back-up system 100 of the present invention can simplify the back-up and restoring of user data within the mobile device 104 without support of the network vendor or mobile operator. The removable media device 102 can maintain a back-up of the user data saved within the mobile device 104 with minimal user interaction. The application 106 can configure the removable media device 102 to perform full and/or incremental back-ups of saved user data. For security purposes, the application can verify a secure key exchange, encrypt the user data, and manage multiple levels of data priority. A method for operating an automatic back-up system 100 including: providing a mobile device 104; coupling the mobile device 104 to a connected removable media device 102 based, at least, on its unique hardware identifier; automatically launching an application 106 on the mobile device 104; and backing-up selected user data by the application 106 from the mobile device 104 to the removable media device 102. The application 106 can be operated or installed in the mobile device 104 based on initial connection of the removable media device 102.

Figure 2:
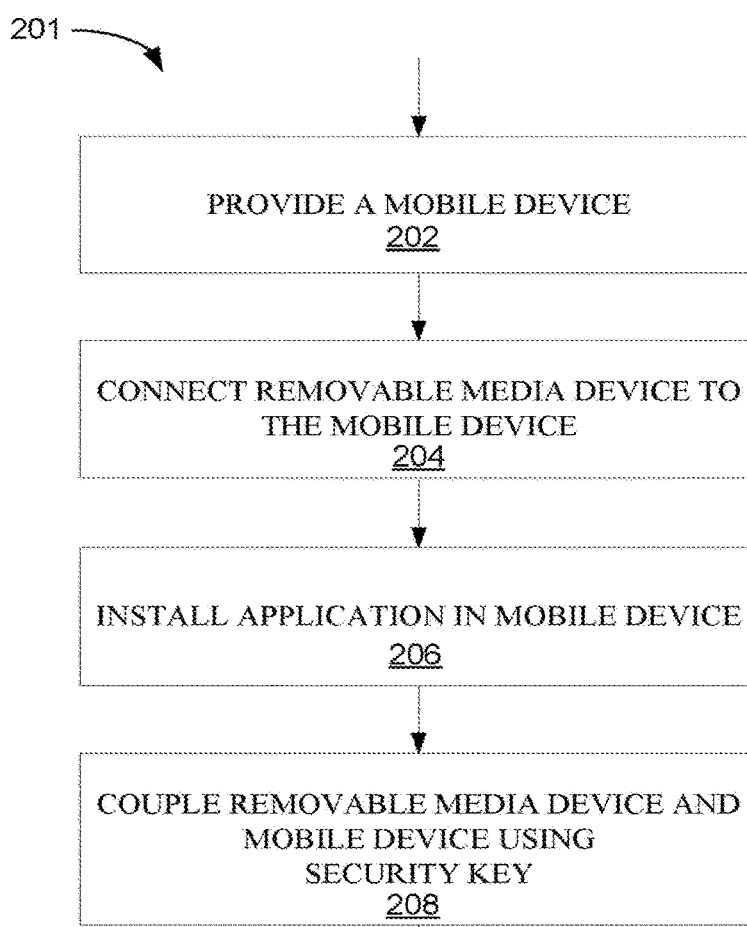
FIG. 2 is a flow chart of installing an application in a mobile device, coupling of the removable media to the mobile device using secure key in an embodiment of the present invention.

Referring now to FIG. 2, therein is shown a flow chart of installing an application 201 in a mobile device 104 of FIG. 1, coupling of the removable media 102 of FIG. 1 to the mobile device 102 using secure key in an embodiment of the present invention. The flow chart of installing the application 201 depicts providing the mobile device 104 capable of communicating with an external device through a wired or wireless interface. The mobile device 104 is provided in a block 202.

The removable media device 102 can be a flash based or mini-disk based storage device with a wired or wireless interface. The removable media device 102 can be connected to the mobile device 104 in a block 204. The connection between the removable media device 102 and the mobile device 104 can be a linking, a coupling/pairing, a registration, a mutual detection, or the like.

The mobile device 104 can load the application 106 of FIG. 1 in preparation for installation. Upon authorization by the user, the application 106 can generate a verification key 110 of FIG. 1 for exchange between the removable media device 102 and the mobile device 104. The installation of the application 106 can occur in a block 206.

With the application 106 installed, the removable media device 102 and the mobile device 104 can couple/pair to establish operating criteria that can include exchange directory set-up, data priority set-up, secure key exchange, encryption key exchange, user interface display criteria, or a combination thereof. The coupling of the removable media device 102 and the mobile device 104 can occur, based on the established operating parameters, in a block 208. The coupling process can include verification of the verification key 110 required for the coupling and an initial access of user data within the mobile device 104 for back-up. The verification of the appropriate coupling is important to properly launch the application 106 and avoid potential use of a counterfeit portable storage device.

It is understood that some of the user data held in the mobile device 104 is confidential, so an encryption, such as an Advanced Encryption Standard (AES) 256-bit encryption, can be used for confidential storage. In an effort to protect the user data, the application 106 can provide a malware scan capability to scan and clear any malware detected in the data on the mobile device 104 that is moved into the removable media device 102.

The automatic back-up system 100 of FIG. 1 can be implemented in an installation process 201 with any number of the mobile device 104 and removable media device 102 coupled to each other. While the number of the mobile device 104 and removable media device 102 that can be coupled to each other is not limited, an installation of the application 106 can occur between the devices that are appropriately coupled. By way of an example, the removable media device 102 can be used to back-up several of the mobile devices 104 as long as the application 106 is executed on each of the mobile device 104. The application 106 can appropriately partition the removable media device 102 and manage the partitions independently.

The automatic back-up system 100 provides an automatic back-up that initiates with the launch of the application 106 when the removable media device 102 is coupled to the mobile device 104. The operating system of the mobile device 104 can associate the coupling of the removable media device 102 with the application 106. Once the association is made, the application 106 can be invoked by coupling the removable media device 102 with the mobile device 104. In an embodiment of the invention, the automatic back-up system 100 and the installation process 201 can load from a website, from a network server, from the removable media device 102, or a combination thereof.

The automatic back-up system 100 allows a user to connect the removable media device 102 to the mobile device 104 in order to launch the application 106.

An embodiment of the invention can provide a link from the removable media device 102 to download the application 106 when the removable media device 102 is connected to the mobile device 104 so that a user can download and install the application 106.

In another embodiment of the invention, the application 106 is stored on the removable media device 102. Upon connecting the removable media device 102 to the mobile device 104, the application 106 is automatically loaded and awaits user authorization to be installed on the mobile device 104 or, potentially, can be run without installation on the mobile device 104 directly from the removable media device 102, and then either with user authorization or, if previously selected by the user, automatically backs up new or modified user data from the mobile device 104 to the removable media device 102.

The application 106 can provide a graphical user interface (GUI) for the user, through the user interface screen 108 of FIG. 1, to interact with the application 106 of the invention. Any user data that is new or modified on the mobile device 104 is automatically backed up to the removable media device 102, which has been coupled to the mobile device 104 at least once.

In another embodiment of the invention, if needed, a user can selectively exclude some of the files from the automatic back-up process above. The priority of the data files and any security accommodation can be established during the installation of the application 106.

In another embodiment of the invention, the application 106 can provide a graphical user interface, through the user interface screen 108, which a user can use to provide permissions and preferences for back-up service as well as monitoring the progress of a back-up, be alerted to any malware detected, acknowledge the exchange of the verification key 110, or a combination thereof.

A method for operating the automatic back-up system 100 includes: providing the mobile device 104 having the user interface screen 108; coupling the removable media device 102 to the mobile device 104 with using the verification key 110; automatically launching the application 106 on the mobile device 104 including displaying a human-readable representation of the selected data 112 to be backed up on the user interface screen 108; backing-up user data selected by the application 106 from the mobile device 104 to the removable media device 102 including selecting files that have changed in the user data of the mobile device 102; and indicating on the user interface screen 108 the completion of the backup operation and safely ejecting the removable media device 102.

In another embodiment of the invention, the user can opt to couple more than one of the mobile device 104 to one of the removable media device 102 for back-up, and can define options as to which files are to be backed up from which of the mobile device 104. The application 106 can establish firewall criteria within one of the mobile device 104 or among a plurality of the mobile device 104 in order to allow the user to control how the user data can be backed-up and restored.

Also, one of the mobile devices 104 could be coupled to more than one of the removable media device 102. For example, one of the mobile devices 104 could be coupled to multiple of the removable media device 102 with various verification keys 110.

Figure 3:
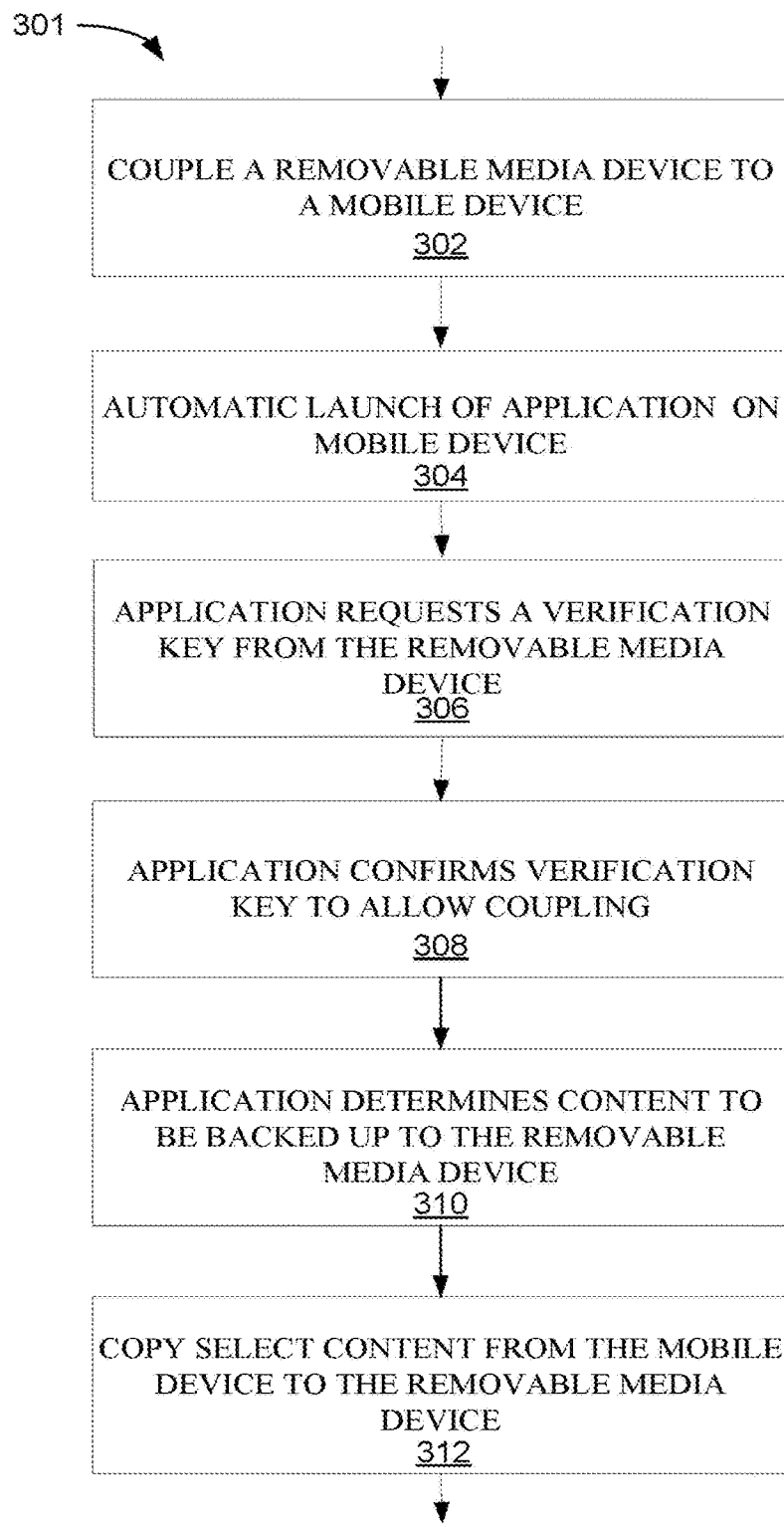
FIG. 3 is a flow chart of the process of automatic launching application on a mobile device and coupling of the removable media device to the mobile device, and copying of the selected content from the mobile device to the removable media device in an embodiment of the present invention.

Referring now to FIG. 3, therein is shown a flow chart of the process 301 of automatic launching application on a mobile device 104 of FIG. 1 and coupling of the removable media device 102 of FIG. 1 to the mobile device, 104 and copying of the selected content from the mobile device 104 to the removable media device 102 in an embodiment of the present invention. The flow chart of the process of coupling 301 depicts the coupling of the removable media device 102 to the mobile device 104 through a wired interface or a wireless interface in a block 302.

In the process 301, the user can connect the removable media device 102 to the mobile device 104 in a block 302. The user can view the acknowledgement of the coupling on the user interface screen 108 of FIG. 1 if they choose to do so. The application 106 will automatically launch when the operating system of the mobile device 104 detects the appropriate one of the removable media device 102. The flow proceeds to an automatic launch of application on mobile device block 304. The application 106 can be displayed on the user interface screen 108. There is no real user interaction required unless the application 106 detects malware in the mobile device 104 or an exception condition occurs during the data transfer, where the exception condition can include insufficient storage space in the destination, data errors, data time-out from the mobile device 104, premature disconnect of the removable media device 102, or the like.

Once the application 106 has launched, the application 106 requests a verification key 110 of FIG. 1 from the removable media device 102 in a block 306. The verification key 110 can be established during the installation of the application 106. The use of the verification key 110 can provide additional security for the user data backed-up on the removable media device 102. The verification key 110 can include a vendor identification number (VID), product identification number (PID), a serial number (SN), a user generated secure key, or a combination thereof.

The flow then proceeds with application 106, which confirms verification key 110 to allow the appropriate coupling/pairing in a block 308. The removable media device 102 must provide a correct version of the verification key 110 in order to allow the coupling for the automatic back-up of the user data.

It is understood that providing an incorrect verification key 110 does not prevent the mobile device 104 from using the removable media device 102 in some other operation. The automatic back-up of the user data, by the application 106, will only proceed if the verification key 110 provided by the removable media device 102 matches the verification key 110 established by the mobile device 104 during the installation process.

Once the verification key 110 is confirmed, the removable media device 102 is coupled to the mobile device 104 for the purpose of automatic back-up of the user data. The flow proceeds with application 106, which determines content to be backed-up to the removable media device 102 in a block 310. The application 106 can retrieve a time and date stamp from the removable media device 102 in order to identify files that have changed or been created since the last back-up. The application 106 can perform a file-by-file compare in the directory of the mobile device 104 in order to determine which of the user data should be eligible for the back-up process.

Copy select content from the mobile device to the removable media device is performed in a block 312. Any user data that is newly created to or is modified on the mobile device 104 is automatically backed-up to the removable media device 102. The application 106 can perform an anti-malware scan, encryption, or a combination thereof prior to queuing the user data for the automatic back-up.

In an embodiment, the removable media device 102 can provide its own encryption and/or anti-malware scan to protect the contents automatically backed up to it. This embodiment can simplify the application 106 and guarantee that potential malware cannot be spread by the removable media device 102 when it is with and between multiple of the mobile devices 104. The embodiment of the invention is not limited to these examples but in fact, the intent is to cover all such methods that are known to those having ordinary skill in the art.

The application 106 can execute entirely on the mobile device, partly on the mobile device, as a stand-alone software package, partly on the mobile device and partly on the removable media device, partly on a remote computer for example, requiring an authorization to run the application 106.

During the installation of the application 106, the user can also be able to define a relevance/importance of the user data files, thus user data files that are more valuable can be backed up first, while those with least relevance can be backed up last. The application 106 can also be conditioned, by the user, to segregate certain of the user data files for additional security, such as encryption levels or distinct access codes for opening the files. There may be other ways to prioritize the user data files and the embodiments of the invention are not limited to the examples cited here.

In an embodiment of the invention, the application 106 can encrypt all of the user data files when they are moved to the removable media device 102. In an embodiment, a virus scan of the user data files is also performed. In an embodiment, the user data file encryption and virus scanning processes can take place entirely on the mobile device 104 to which the removable media device 102 is coupled. In an embodiment, the data encryption and virus scanning software can be pre-bundled within the removable media device 102. In an embodiment, the encryption and virus scanning can occur within the removable media device 102 without support from the mobile device 104.

It has been discovered that the automatic back-up system 100 of the present invention can provide a reliable automatic back-up of the user data from a mobile device 104 without user intervention. By way of an example, if the removable media device 102 is attached to or part of a charging station, including an alternating current (AC) adapter, a portable emergency charger, a proximity charging station, or the like, when the mobile device 104 is coupled for charging, the application 106 can automatically back-up the user data from the mobile device 104 with no further user intervention required. When the automatic back-up is complete, the application 106 can "decouple" (safely eject) the removable media device 102 from the mobile device 104 and discontinue operation.

Figure 4:
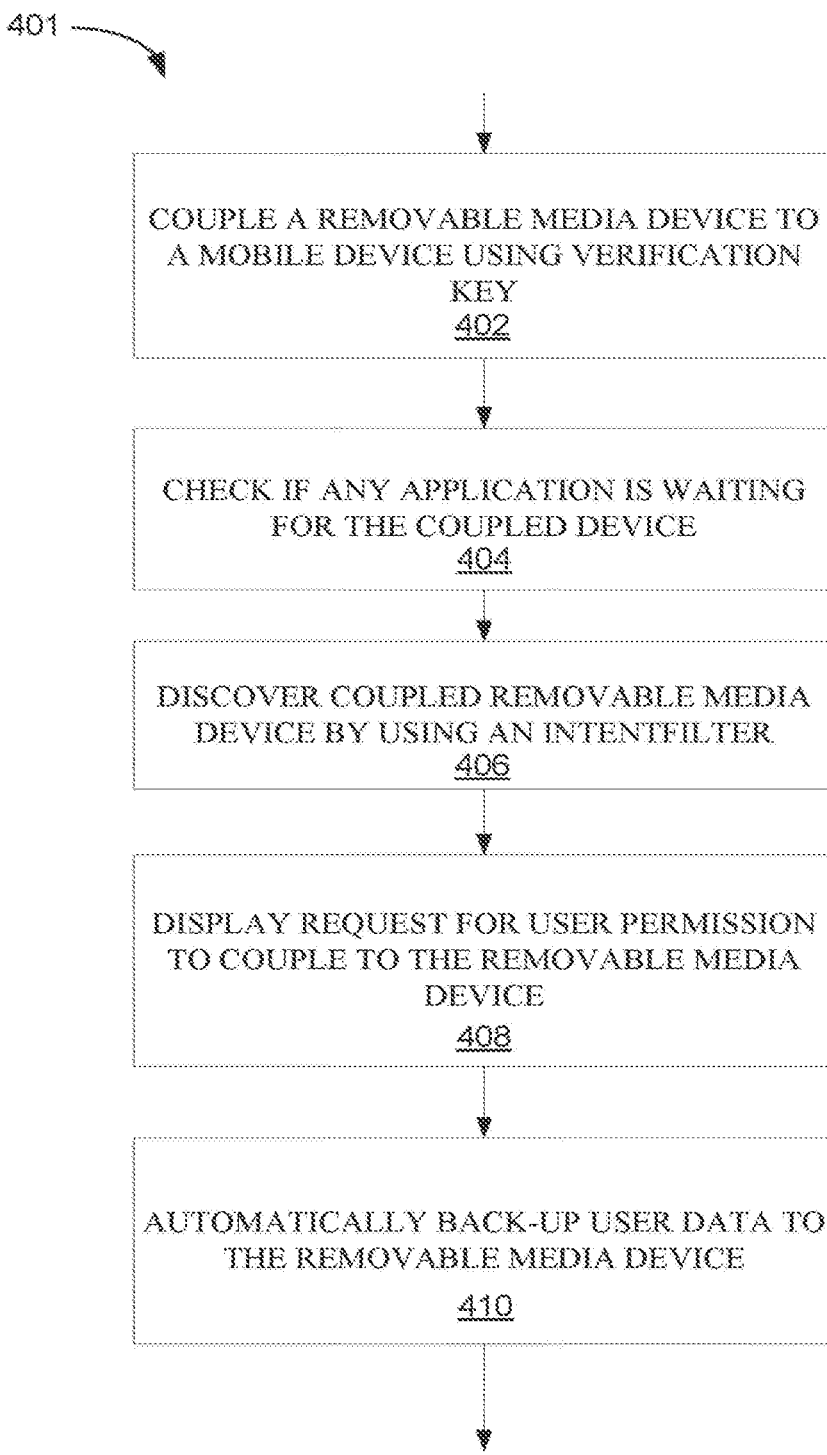
FIG. 4 is a flow chart of a back-up process to launch the application in an embodiment.

Referring now to FIG. 4, therein is shown a flow chart of a back-up process to launch the application 106 of FIG. 1 in an embodiment of the invention. The flow chart of the back-up process 401 depicts a couple of the removable media device 102 of FIG. 1 to the mobile device 104 of FIG. 1 using a verification key 110 of FIG. 1 in a block 402.

The removable media device 102 can present the verification key 110 established during installation of the application 106 to automatically initiate a data back-up process when the removable media device 102 is connected to the mobile device 104. The operating system on mobile device 104 can query any application that can be waiting for the coupling of the removable media device 102. This is performed in a check if any application is waiting for the coupled device in a block 404. By way of an example, the operating system can implement an IntentFilter for linking applications to a device interrupt, such as coupling the removable media device 102.

"Discover coupled removable media device by using the IntentFilter" is performed in a module 406. The "IntentFilter" specifies the types of "Intents" to which an activity, service, or broadcast receiver responds in certain applications. It should be noted that most operating systems have similar commands/services known by other names.

The use of the IntentFilter allows for the authorized launch of the application 106 and the initiation of a back-up process when the already coupled removable media device 102 of FIG. 1 is connected to the mobile device 104. The IntentFilter determines the status of the removable media device 102, and when the removable media device 102 is connected to the mobile device 104 it proceeds with a set of steps that can allow the application 106 to execute. The IntentFilter can display a request for user permission to connect, or couple, to the removable media device 102 in a block 408. The IntentFilter can display the request on the user interface screen 108 of FIG. 1 to get the user's attention. There can be an accompanying audible, visual, vibratory alert, or a combination thereof used to get the user's attention to the request for authorization.

Once the user has authorized the coupling of the removable media device 102, the application 106 can be launched to perform the automatic back-up process. Any user data file that is new to the removable media device 102 or user data that is modified on the mobile device 104 is automatically backed up to the removable media device 102 without requiring any additional user interaction. The IntentFilter authorizes the capabilities of its parent component, such as what an activity or service is authorized to perform and what types of broadcasts a receiver can handle.

The flow proceeds to automatically back-up user data to the removable media device 102 in a block 410. The application 106 can be enabled to perform the automatic back-up of the user data.

The embodiments of the invention disclosed herein provide an automated method and system whereby the IntentFilter service in the operating system running on the mobile device is used to execute the application 106 when the removable media device 102 is an already coupled (at least, logically) to the mobile device 104. The user is optionally prompted to, at least once, provide permission (authorization) for coupling the removable media device 102 to the mobile device 104. Once the coupling is complete and the coupling credentials stored in the application 106 (or on a removable media; in some embodiments of the invention, licensing can be implemented to allow for single and/or multi-removable media and/or mobile device usage), the IntentFilter detects the next connection acknowledgment of the removable media device 102 to the mobile device 104 and launches the application 106, which initiates the automatic back-up of user content that is new or modified on the mobile device 104 to the removable media device 102.

Essentially, the use of the IntentFilter allows for the automatic launch of the application 106 and the initiation of the back-up process when the removable media device 102 is connected to the mobile device 104 after the user has once authorized the process. The IntentFilter detects the status of the removable media device 102. When the removable media device 102 (by registering with the predefined list of verification keys from different media storage vendors and pre-authorized products) is connected to the mobile device 104, the application 106 can proceed with the automatic back-up of the user data. It is understood that the use of the IntentFilter is an example only and any software linking the target of the application 106 to the action of coupling the removable media device 102 can be used.

Figure 5:
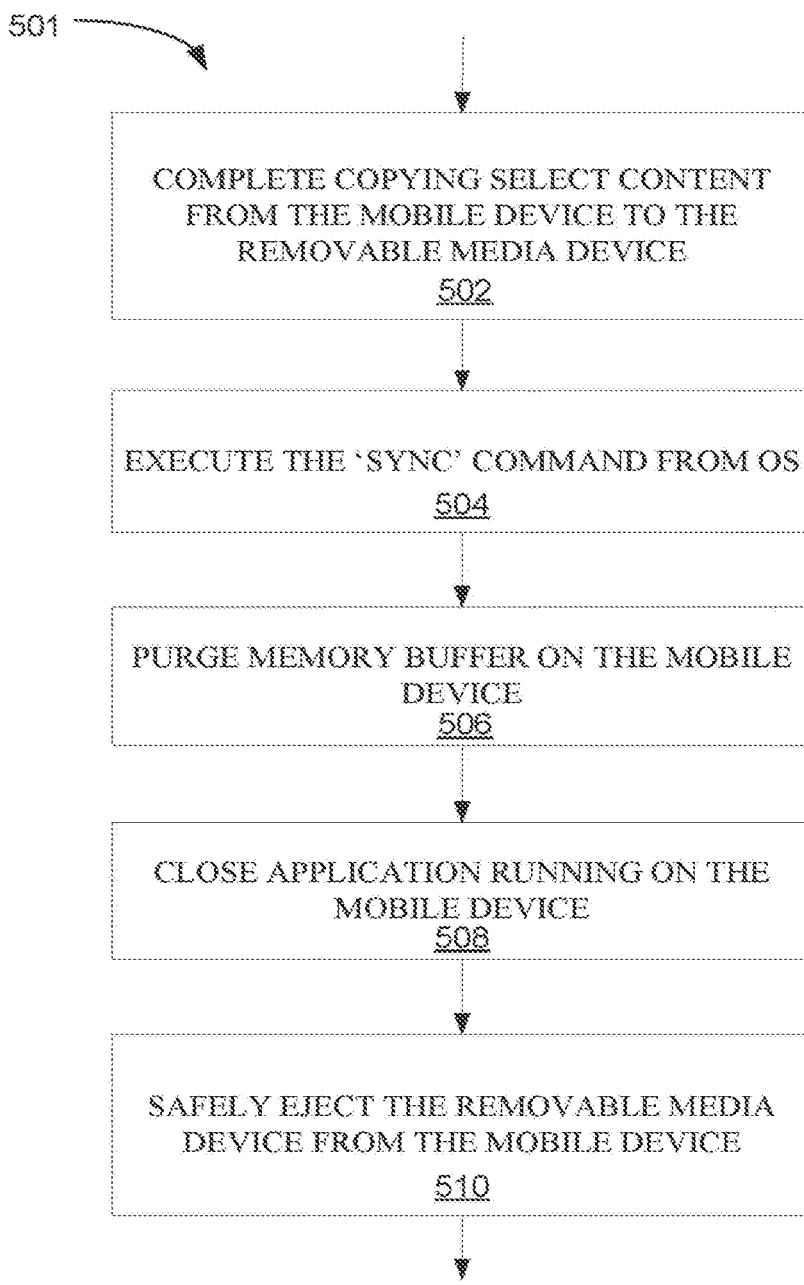
FIG. 5 is a flow chart of a back-up using a synchronization command to write data to the removable media device, the safe ejection of the removable media device, and closing of the application when data back-up is complete in an embodiment of the present invention.

Referring now to FIG. 5, therein is shown a flow chart of a back-up 501 using a synchronization command to write data to the removable media device, the safe ejection of the removable media device, and closing of the application when data back-up is complete in an embodiment of the present invention. The flow chart of the back-up 501 begins with the application 106 of FIG. 1 to complete copying select content from the mobile device to the removable media device performed in a block 502.

By way of an example, the application 106 can execute the "Sync" command from the OS in a block 504. In one embodiment of the invention, the application 106 can execute the "Sync" command to flush any of the user data, still in a memory buffer of the mobile device 104, to the removable media device 102.

The "Sync" command writes any data buffered in memory out to the removable media device 102. This can include (but is not limited to) modified superblocks, modified nodes, and delayed reads and writes. The "Sync" command can be implemented by the kernel and called by the application 106. It is understood that the operating system can implement other services to perform the "Sync" command, which is used as an example for ease of description.

"Purge memory buffer on the mobile device" occurs in a block 506. Thus, the application 106 can use the "Sync" command, which is generally used for writing data in memory buffer to the internal hard drive, in a different and not-expected way to commit the data that is buffered for back-up to the removable media device 102, to ensure that no data is lost.

"Close application running on the mobile device" is performed in a block 508. The application 106 can communicate to the removable media device 102 that the back-up 501 is complete and no additional data is to be backed-up.

"Safely eject the removable media device from the mobile device" so that the user can physically disconnect is performed in a block 510. The ejection of the removable media device 102 allows the operating system to remove the removable media device 102 from its memory map without creating an error. An inadvertent removal of the removable media device 102 after the back-up is complete, but prior to being removed from the memory map, can cause the operating system to detect a memory error, but cannot impact the data in the removable media device 102.

Embodiments of the present invention overcome this limitation by, for example, executing the Sync command to ensure that data in the memory buffers is written to the removable media device 102 and the user is not required to be constantly seeking the safe removal notification. Upon completion of the back-up 501, the application 106 will close and will no longer be displayed on the user interface screen 108. This can be an indicator to the user that the removable media device 102 is no longer required for the back-up process and can be decoupled.

In some embodiments of the invention, the removable media device 102 can be used to automatically move user data from one mobile device 104 to another. For example, the removable media device 102 can be coupled to more than one mobile device 104, and user data can be automatically backed up from a first mobile device and then copied to a second mobile device when the removable media device is connected to a second mobile device. The application 106 can perform a restore operation to decrypt the stored user data and copy the contents of the removable media device 102 that meets the security authorization and confirmation of the verification key 110.

It should be noted that by using the method of an embodiment of the invention as disclosed in this application, automatic back-up can be achieved that is easy to use and requires minimal or no interaction from the user. Thus, the user data files that are new or modified on the mobile device 104 are automatically backed up to the removable media device 102 that is coupled to the mobile device using the verification key 110.

It would be understood by one having ordinary skill in the art that a "restore" command can transfer the user data from the removable media device 102 to the mobile device 104. In a restore operation of the user data, the application 106 can confirm the verification key 110, request an encryption/decryption key (often called—encryption key) from the removable media device 102, and decrypt the user data using the encryption/decryption key. The user data can be restored to the original unit of the mobile device, or to a new one of the mobile device having authorized access to the user data. The authorization can be related to the verification key 110.

It is to be noted that an embodiment of the invention is not limited to these examples, and the intent is cover all possible removable media and computing devices that are available in the market today or will become available in the future as the computing industry evolves over time. The intent of the application is to cover all such combinations and permutations not listed here but that are obvious to those having ordinary skill in the art. The above examples are not intended to be limiting, but are illustrative and exemplary.

It is understood that although the term application has been used as an example in this disclosure, in essence the term can also apply to any other piece of software code where the embodiments of the invention are incorporated. The software application can be implemented in a stand-alone configuration or in combination with other software programs and is not limited to any particular operating system or programming paradigm described here. Thus, an embodiment of this invention is intended to cover all applications and user interactions described above as well as those obvious to those having ordinary skill in the art.

In one embodiment of the invention the application of an embodiment of the invention can be licensed based on the Unique Device Identifier (UDI) or other methods.

The computer program includes a computer usable medium having computer usable program code; the computer usable program code includes computer usable program code for presenting graphically to the users options for scrolling via the user interface screen 108.

Figure 6:
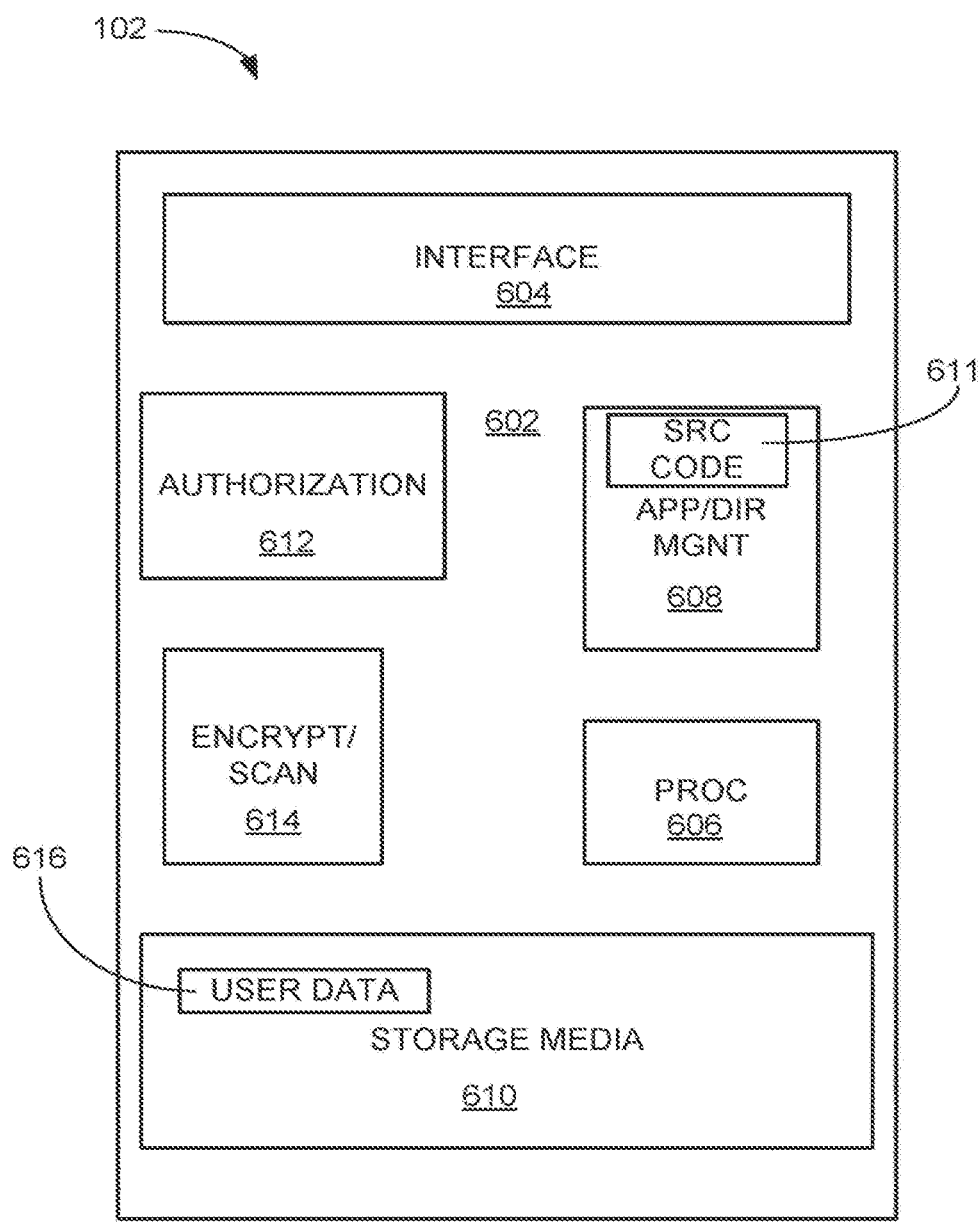
FIG. 6 is a functional block diagram of a removable media device in an embodiment of the present invention.

Referring now to FIG. 6, therein is shown a functional block diagram of a removable media device 102 in an embodiment of the present invention. The functional block diagram of the removable media device 102 depicts a removable media carrier 602, such as a printed circuit board assembly, flex circuit, semiconductor substrate, or the like.

The removable media carrier 602 can include an interface circuit 604, which can include a Universal Serial Bus (USB), a BlueTooth interface, a wireless proximity interface, or the like for communicating with the mobile device 104 of FIG. 1. It is understood that the interface circuit 604 can communicate with devices other than the mobile device 104.

The interface circuit 604 can be supported by a processor 606 for managing the functions of the removable media device 102. The processor 606 can include a bit-slice processor, a sequential state machine, a micro-processor, a micro-computer or the like. The processor 606 can communicate with the application 106 of FIG. 1 that is installed in the mobile device 104. The processor 606 can be coupled to an app/directory manager module 608, which can provide application source code 611 or a link to a website for the application 106 that can be transferred to the mobile device 104 for the installation.

The app/directory manager module 608 can include volatile and non-volatile memory used to direct back-up data to a storage media 610. The app/directory manager module 608 can coordinate the use of the storage media 610 for providing data for the application source code 611, restore data, or back-up data. The app/directory manager module 608 can segregate the partitions of back-up data from a plurality of the mobile device 104. The storage media 610 can be flash memory, a mini-disk, or other non-volatile memory.

The processor 606 can also be coupled to an authorization module 612, which can include non-volatile memory for storing the verification key 110 of FIG. 1 for the mobile device 104. The authorization module 612 can include selection logic for presenting the correct verification key 110 for the mobile device 104 which is coupled to the removable media device 102.

The processor 606 can also be coupled to an encryption and antivirus scanning module 614 that can include volatile and non-volatile memory and support logic for performing a virus/malware scan and encryption of confidential data that was flagged during the installation of the application 106. It is understood, that the encryption and antivirus scanning module 614 can be implemented as two separate modules—encryption/decryption and antivirus scanning or a combination thereof. The encryption and antivirus scanning module 614 can include more than one processor in order to provide the Advanced Encryption Standard (AES) 256-bit encryption for securing confidential data within the storage media 610. The decryption of the restored data, which was copied from the removable media device 102 to the mobile device 104, can be decrypted by the application 106. The encryption and antivirus scanning module 614 can also provide a link to website for updated virus/malware scan definitions that can be retrieved by the application 106. The virus/malware scan of user data 616 can be performed in the encryption and antivirus scanning module 614 prior to transferring the user data 616 to the storage media 610.

It is understood that other configurations of the removable media device 102 are possible. The example provided is for explanation only and is not limited to this implementation.

Figure 7:
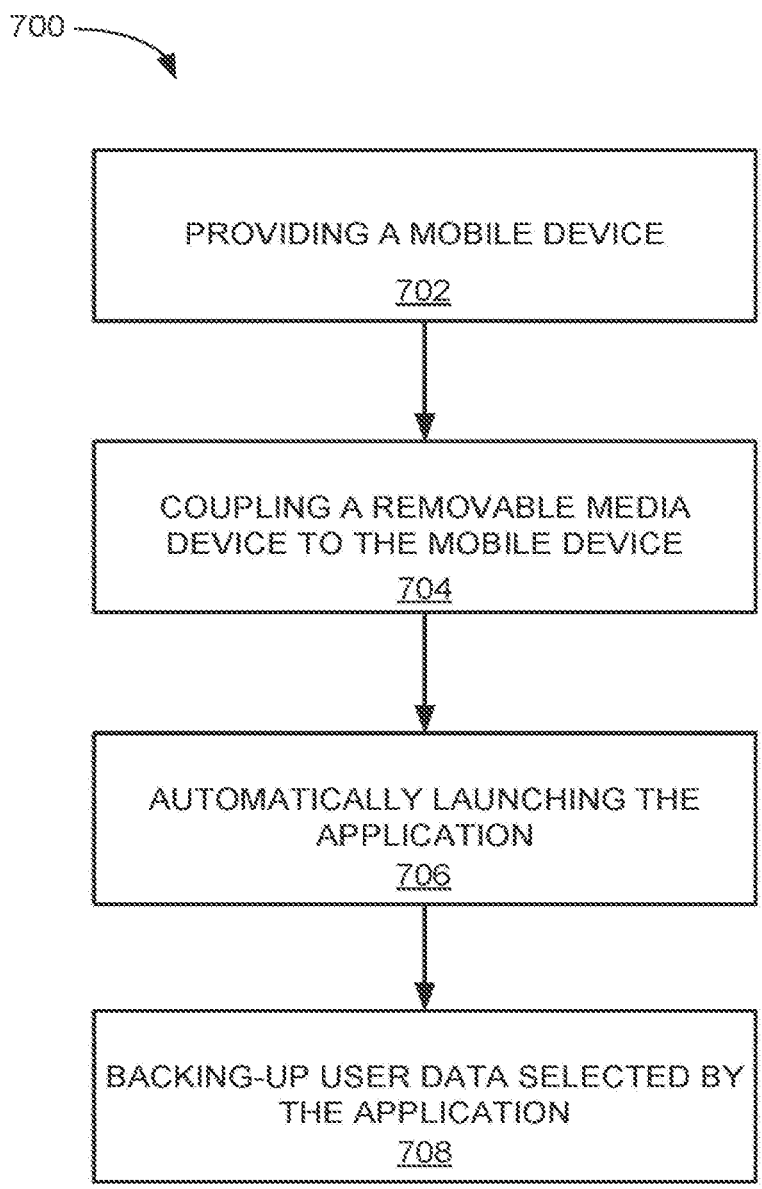
FIG. 7 is a flow chart of a method of operation of an automatic back-up system in an embodiment of the present invention.

Referring now to FIG. 7, therein is shown a flow chart of a method of operation of the automatic back-up system 700 in a further embodiment of the present invention. The method 700 includes: providing a mobile device in a block 702; coupling a removable media device to the mobile device in a block 704; automatically launching an application on the mobile device in a block 706; and backing-up user data selected by the application from the mobile device to the removable media device in a block 708.

It has been discovered that the data back-up system provides the previously described solutions to problems of ever-increasing complexity of technology along with growing consumer expectations for simplified products. Solutions to these problems have been long sought but prior developments have not taught or suggested any solutions and, thus, solutions to these problems have long eluded those skilled in the art.

Another important aspect of the present invention is that it valuably supports and services the historical trend of reducing costs, simplifying systems, and increasing performance.

These and other valuable aspects of the present invention consequently further the state of the technology to at least the next level.

A method for operating an automatic back-up system includes:
providing a mobile device;
coupling the mobile device to a connected removable storage media device based, at least, on its unique hardware identifier;
automatically launching an application on the mobile device; and
backing-up selected user data by the application from the mobile device to the removable media device.

The method for operating an automatic back-up system further includes confirming a verification key by the application for allowing the coupling of the removable media device and where the verification key includes a vendor identification number, product identification number, a serial number, a user generated secure key, and a combination thereof.

The method for operating an automatic back-up system further includes encrypting the user data before storing in a storage media.

The method for operating an automatic back-up system further includes anti-virus (malware protection) scanning of the user data before storing in the storage media.

The method for operating an automatic back-up system further includes installing the application in the mobile device based on initial connection of the removable media device.

The method for operating an automatic back-up system further includes restoring the user data to the mobile device when the application has confirmed a verification key.

A method for operating an automatic back-up system includes:
providing a mobile device having a user interface screen;
coupling a removable media device to the mobile device;
automatically launching an application on the mobile device including displaying a humanly-readable representation of user data to be backed up on the user interface screen;
backing-up the user data selected by the application from the mobile device to the removable media device including selecting files that have changed in the user data of the mobile device; and
indicating on the user interface screen the completion of a backup operation and safely ejecting the removable media device.

The method for operating an automatic back-up system further includes encrypting the user data before storing in a storage media including processing the user data by an encryption module.

The method for operating an automatic back-up system further includes processing the user data by an antivirus scanning module before encrypting the user data and storing in the storage media.

The method for operating an automatic back-up system further includes installing the application in the mobile device, including transferring a link to a website for installing the application.

The method for operating an automatic back-up system further includes restoring the user data to the mobile device when the application has confirmed a verification key.

An automatic back-up system includes:
a mobile device;
a removable media device coupled to the mobile device; and
a processing unit in the mobile device configured to:
automatically launch an application on the mobile device, and
back-up user data selected by the application from the mobile device to the removable media device or restore user data selected by the application from the removable media device to the mobile device.

The automatic back-up system described above includes the processing unit which is further configured to confirm a verification key from the removable media device.

The automatic back-up system further includes an encryption module in the removable media device configured to encrypt the user data and storing a security key on the removable media device.

The automatic back-up system further includes:
a user interface screen in the mobile device; and
an app/directory manager module in the removable media device configured to direct the backed-up user data.

The automatic back-up system further includes an authorization module in the removable media device configured to store the verification key which includes a vendor identification number, product identification number, a serial number, a user generated secure key, and a combination thereof.

The automatic back-up system further includes an encryption module in the removable media device configured to encrypt the user data before the user data is stored in a storage media. It can also have an antivirus application scanning data for viruses and malware before it gets encrypted and stored in a storage media.

The automatic back-up system includes the processing unit which is further configured to install the application and includes an Interface circuit configured to send the application source code from the app/directory manager module in the removable media device.

The automatic back-up system includes the processing unit which is further configured to restore the user data to the mobile device when the application has confirmed a verification key.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating an automatic back-up system comprising:
   detecting, by a computing device, a coupling of a removable storage media device to the computing device, wherein the removable storage media device includes an authorized hardware identifier comprising one or more of a vendor identification number, a product identification number, and a serial number;
   launching, by an operating system in the computing device, an application on the computing device in response to detecting the coupling of the removable storage media device;
   requesting, by the application, the authorized hardware identifier from the removable storage media device;
   verifying, by the application, the authorized hardware identifier against a list of authorized hardware identifiers;
   authorizing, by the application, the coupling of the removable storage media device based on the verification; and
   when the coupling of the removable storage media device is authorized, enabling read and write operations between the removable storage media device and the computing device.

2. The method as recited in claim 1, wherein the coupling is a wireless coupling via wireless communication between the removable storage media device and the computing device.

3. The method as recited in claim 2, wherein the wireless communication is via Bluetooth.

4. The method as recited in claim 2, wherein the wireless communication is via a proximity coupling interface.

5. The method as recited in claim 1, wherein the application includes a list of authorized hardware identifiers.

6. The method as recited in claim 1, further comprising:
   receiving, at the removable storage media device, a write operation of user data;
   encrypting, at the removable storage media device, the user data; and
   storing the encrypted user data in a storage media of the removable storage media device.

7. The method as recited in claim 1, further comprising:
   receiving, at the removable storage media device, a write operation of user data;
   antivirus scanning, at the removable storage media device, the user data; and
   storing, after the antivirus scanning, the user data in a storage media of the removable storage media device.

8. The method as recited in claim 1, further comprising:
   after the coupling of the removable storage media device is authorized, displaying, on a screen of the computing device, options for selecting user data for back-up;
   receiving, at the computing device, a selection of user data; and
   backing-up the selection of user data to the removable storage media device.

9. The method as claimed in claim 1, further comprising:
   exchanging an encryption key between the application on the computing device and the removable storage media device.

10. A system comprising:
    a memory comprising instructions; and
    one or more computer processors, wherein the instructions, when executed by the one or more computer processors, cause the one or more computer processors to perform operations comprising:
       detecting a coupling of a removable storage media device to a computing device, wherein the removable storage media device includes an authorized hardware identifier comprising one or more of a vendor identification number, a product identification number, and a serial number;
       launching, by an operating system in the computing device, an application on the computing device in response to detecting the coupling of the removable storage media device;
       requesting, by the application, the authorized hardware identifier from the removable storage media device;
       verifying, by the application, the authorized hardware identifier against a list of authorized hardware identifiers;
       authorizing, by the application, the coupling of the removable storage media device based on the verification; and
       when the coupling of the removable storage media device is authorized, enabling read and write operations between the removable storage media device and the computing device.

11. The system as recited in claim 10, wherein the coupling is a wireless coupling via wireless communication between the removable storage media device and the computing device.

12. The system as recited in claim 11, wherein the wireless communication is via Bluetooth.

13. The system as recited in claim 11, wherein the wireless communication is via a proximity coupling interface.

14. The system as recited in claim 10, wherein the application includes a list of authorized hardware identifiers.

15. The system as recited in claim 10, wherein the instructions further cause the one or more computer processors to perform operations comprising:
    receiving, at the removable storage media device, a write operation of user data;
    encrypting, at the removable storage media device, the user data; and
    storing the encrypted user data in a storage media of the removable storage media device.

16. The system as recited in claim 10, wherein the instructions further cause the one or more computer processors to perform operations comprising:
    receiving, at the removable storage media device, a write operation of user data;
    antivirus scanning, at the removable storage media device, the user data; and
    storing, after the antivirus scanning, the user data in a storage media of the removable storage media device.

17. The system as recited in claim 10, wherein the instructions further cause the one or more computer processors to perform operations comprising:
    after the coupling of the removable storage media device is authorized, displaying, on a screen of the computing device, options for selecting user data for back-up;
    receiving, at the computing device, a selection of user data; and
    backing-up the selection of user data to the removable storage media device.

18. The system as recited in claim 10, wherein the instructions further cause the one or more computer processors to perform operations comprising:
    exchanging an encryption key between the application on the computing device and the removable storage media device.

\* \* \* \* \*

UNITED STATES PATENT AND TRADEMARK OFFICE
CERTIFICATE OF CORRECTION

PATENT NO. : 10,146,461 B2  
APPLICATION NO. : 15/959499  
DATED : December 4, 2018  
INVENTOR(S) : Lemelev et al.

It is certified that error appears in the above-identified patent and that said Letters Patent is hereby corrected as shown below:

In the Specification

In Column 5, Line 21, delete "102" and insert --104-- therefor

In Column 7, Line 1, delete "102;" and insert --104;-- therefor

Signed and Sealed this  
Tenth Day of March, 2020

Andrei Iancu  
*Director of the United States Patent and Trademark Office*